No. 803,201.
PATENTED OCT. 31, 1905.
W. & G. VICKERY & T. HARDING.
FASTENER AND SEAL FOR BOXES, &c.
APPLICATION FILED DEC. 23, 1903.
3 SHEETS—SHEET 1.
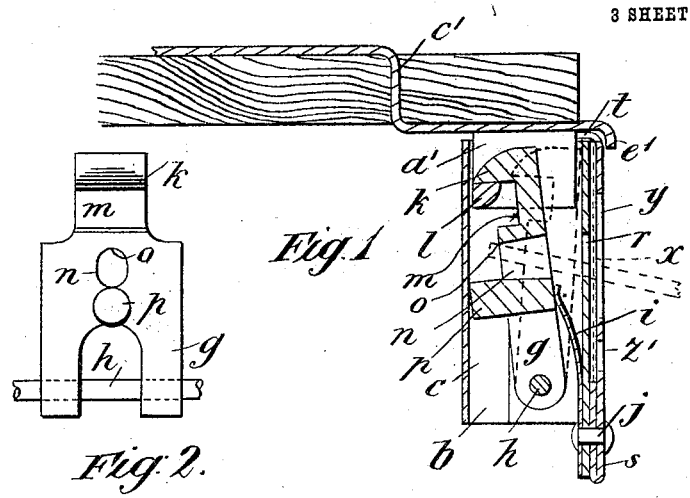
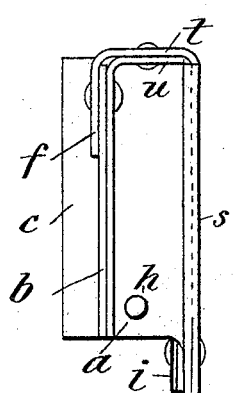
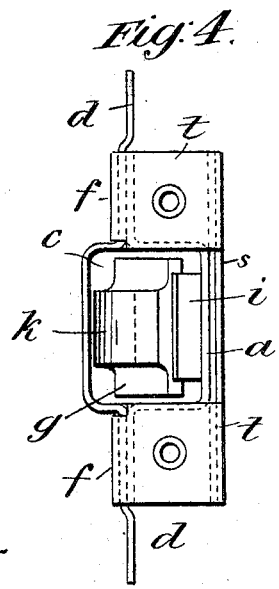
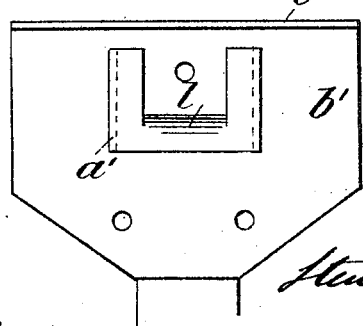
Witnesses
Inventors
W. Vickery
G. Vickery
T. Harding
by
Stewart & Stewart
Attys No. 803,201. PATENTED OCT. 31, 1905.
W. & G. VICKERY & T. HARDING.
FASTENER AND SEAL FOR BOXES, &c.
APPLICATION FILED DEC. 23, 1903.

3 SHEETS—SHEET 2.

Inventors
W. Vickery
G. Vickery
T. Harding

Witnesses

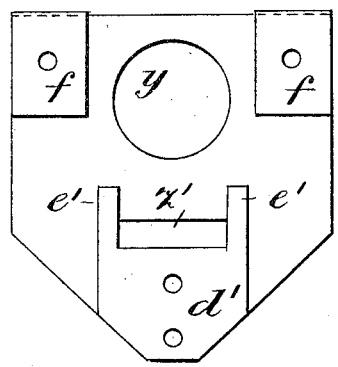
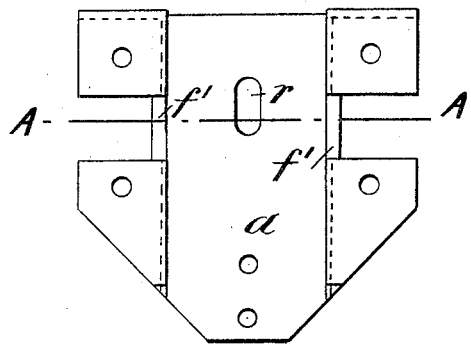
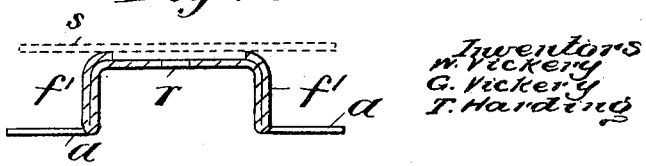

UNITED STATES PATENT OFFICE.

WILLIAM VICKERY, OF MILVERTON, GEORGE VICKERY, OF NORTON FITZ-WARREN, AND TOM HARDING, OF WIVELSCOMBE, ENGLAND.

FASTENER AND SEAL FOR BOXES, &c.

No. 803,201.  Specification of Letters Patent.  Patented Oct. 31, 1905.

Application filed December 23, 1903. Serial No. 186,356.

*To all whom it may concern:*

Be it known that we, WILLIAM VICKERY, residing at Sand street, Milverton, GEORGE VICKERY, residing at Mill House, Norton Fitzwarren, and TOM HARDING, residing at 2, The Square, Wivelscombe, county of Somerset, England, subjects of the King of Great Britain and Ireland, have invented a certain new and useful Improvement in and Relating to Fasteners and Seals for Boxes, &c., of which the following is a specification.

This invention relates to the fastenings for boxes, cases, or the like known as "seal-fastenings" and in which the latch is freed by means of a blunt instrument, a ticket or other form of seal being so arranged that upon the introduction of the operating instrument the said seal shall be perforated or torn, thereby revealing the fact that an attempt has been made to open the box.

With devices of this nature as at present constructed certain inherent defects are present due to faulty construction and to the consequent fragility and complication of the locking parts and to the inadequacy of the lock to make the locked lid sufficiently secure in its locked position and to the facility with which it can be opened without conspicuously apparent injury to the seal.

The present invention has primarily for its object to construct and arrange the latch in such a manner and position as to prevent the operation thereof by means of an instrument other than one of such dimensions as to tear or puncture the card in such manner as to make evident at a glance that the lock has been operated or its operation attempted. In addition to this the peculiar method of constructing the case of the lock is such as to minimize any chance of accidental damage to the lock itself or to the sealing ticket or tablet therein and also to provide a ready means for the removal of any dirt or foreign matter that may collect in the ticket-receptacle.

In order that the invention may be the better understood, drawings are appended, in which—

Figure 6:
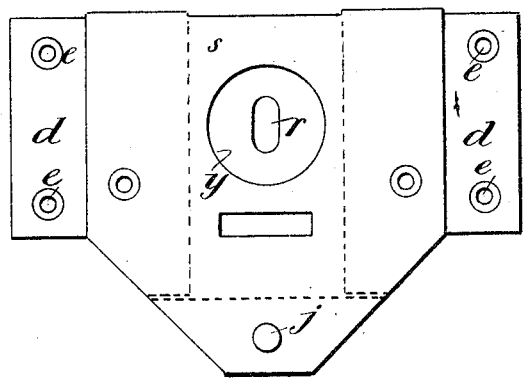
Figure 7:
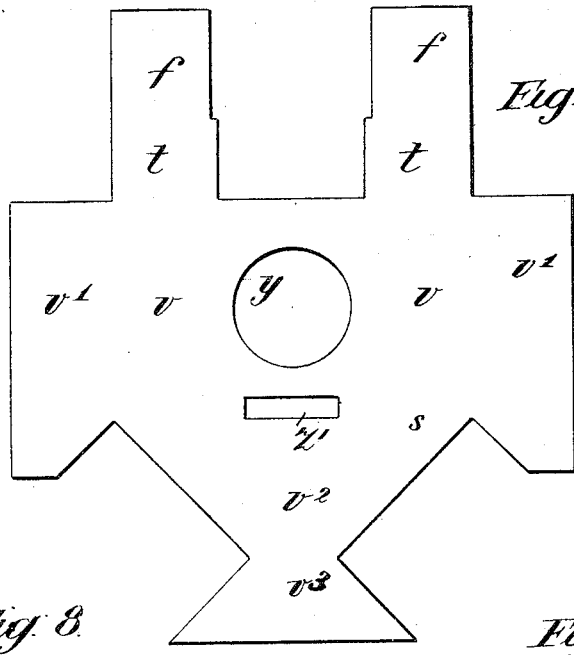
Figure 8:
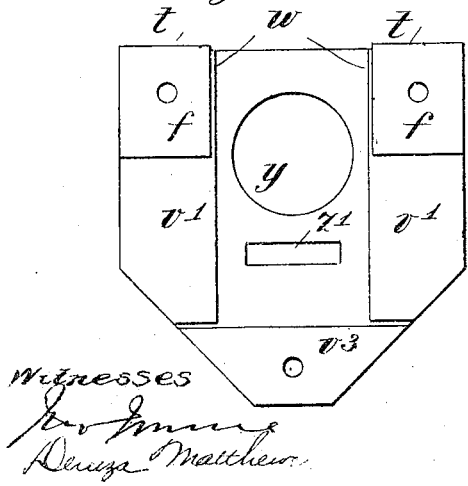
Figure 9:
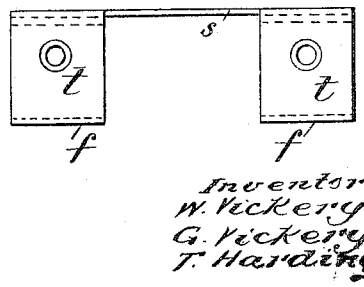

Figure 1 is a transverse section of the improved latch applied to a box or case. Fig. 2 is an elevational view from the back of the latch proper. Fig. 3 is a side view of the outer containing-case for the latch. Fig. 4 is a plan of the latch and its case. Fig. 5 is a plan of the hasp. Fig. 6 is a front elevation of the latch-case. Figs. 7 and 8 and 9 illustrate the peculiar construction of the front plate of the latch-case. Figs. 10 and 11 illustrate a further modification of the method of forming the ticket-cavity. Fig. 12 is a section on line A A, Fig. 11.

Referring to the accompanying drawings, it will be seen that the case for the latch consists, essentially, of two parts $a$ and $b$, the part $b$ forming the base or foundation of the case, comprising a plate in which is provided a substantially rectangular longitudinal depression $c$, the plane portion of the plate being provided with extensions $d$, serving as an additional means for effecting the firm attachment to the box by means of screws or the like passing through holes $e$, Fig. 6.

The front portion of the latch-casing $a$ is formed in a substantially similar manner as that already described, the two being secured together by placing them face to face when the recesses therein are coincident and securing them together by rivets or the like passing through the plane portions. The front part of the case is not necessarily provided with extensions similar to those $d$ upon the back $b$; but, if desired, such extensions may be added thereto. The two recesses form the latch-chamber, in which is located the latch $g$, pivoted at its lower end by means of the pin $h$ to the front $a$ of the casing. A spring $i$ bears against the front of the latch, as shown in Figs. 1 and 4, being secured at its lower end to the case by means of a rivet $j$, which rivet also serves to connect the other component members of the case together.

The latch $g$ is of the form shown by Figs. 1 and 2, comprising a rounded nose-piece $k$, adapted to engage the cross-bar $l$ of the hasp, and provided at $m$ with a recess to permit its full engagement with said bar. An oval opening $n$ is formed through the body of the latch, the end walls of which are somewhat inclined and against the outer edge $o$ of which the actuating instrument (indicated by dotted lines) takes a bearing to force the latch backward against the action of the spring $i$, its rear position being indicated by the dotted lines, Fig. 1, where it is free of the cross-bar $l$. A stop $p$ limits the movement of latch $g$, so that it is prevented from occupying a position such as to prevent its ready displacement by the bar $l$ when the lid is closed.

An aperture $r$, formed in the front $a$ of the case, which is preferably of an outline corresponding to the opening $n$, permits the passage of the operating instrument. Secured by rivets or the like to the front portion of the case is a plate $s$. This plate is provided at its upper end with horizontal portions $t$, which overlie similar parts $u$, formed at the upper end of the front $a$ of the case, and through which parts holes are formed for the passage of screws for assisting in securing the whole to the front of the box. (See Fig. 4.) Extensions $f$ are formed upon the parts $t$, which are turned downward and secured by rivets to the plate $b$. (See Figs. 3, 4, 7, 8, 9, and 10.) The front plate $s$ is formed as shown in Figs. 7, 8, and 9. In Fig. 7 the blank is shown from which the plate is formed by bending up into the shape shown by Figs. 8 and 9. The parts $v'$ are folded back upon the wings $v$ and the part $v^3$ upon the end $v^2$ of the plate, and the edges of these folded parts meeting at their corners and inclosing a quadrangular space between them serve to form a recess $w$, adapted to receive the sealing-ticket $x$. (Shown by dotted lines, Fig. 1.) A circular hole $y$ permits access to the hole $r$, the ticket $x$ aforesaid being interposed between them, so that it must of necessity be punctured by the passage of the opening instrument. An opening $z'$, formed in the plate $s$ at a point below the aperture $y$, permits of the ready removal of any foreign matter from the ticket-receptacle.

Instead of forming the ticket-cavity by bending the front plate in the manner previously described with reference to Figs. 6, 7, and 8 we may attach to the back of the front plate $s$ a piece of sheet metal $d'$, shaped as shown in Fig. 10, and which is provided with arms $e'\ e'$, upon the ends of which the ticket is supported. The lateral displacement of the ticket is prevented by bending backward the parts $f'\ f'$, which are formed by cutting the plane portions of the front of the case, as illustrated by Fig. 11, and bending back the said parts. The general arrangement of the parts when in position is indicated by Fig. 12, in which the front plate $s$ is indicated by dotted lines.

The hasp $a'$, of which the bar $l$ forms part, is formed of a piece of metal bent into an approximately U-shaped form, the central portion of the horizontal member being reduced to form the bar $l$. The ends of the vertical portion are secured by riveting to the plate $b'$, which is bent as shown in Fig. 1 at $c'$, where it passes through the lid of the box. The hasp is formed of such shape and dimensions, as shown in Fig. 5, as to fill the opening in the top of the latch-case when the box is closed, and thus secure the closed lid against end or sidewise movement when the box is locked. The hasp is secured to the part $b'$ which is upon the under side of the lid and which is provided at its outer edge with a flange $e'$, adapted when the lid is closed to project over the front of the latch-casing and prevent the removal of the sealing-ticket from its recess.

To secure the latch to the box, an opening is cut in the front of the box, the opening being of such dimensions as to accommodate the body of the case, which fits snugly therein, the projecting portions of the casing and of the front plate lying, respectively, against the rear and front surfaces of the wood, to which it is secured by screws.

When in use, a card is slipped into the recess formed in the front of the case, and the lid closed when the latch is first forced aside by the hasp until the bar thereof is below the plane of the lower edge of the nose-piece $k$, when the spring $i$ forces the latch over until the said nose-piece is in a position engaging the bar, so as to prevent its withdrawal. The parts then occupy the position indicated in Fig. 1, from which it will be seen that in order to actuate the latch the operating instrument, which may be an ordinary iron nail or a piece of stiff wire or such like implement, must first perforate the sealing-card and be pushed through the openings formed in the front of the case and in the latch until its movement is checked by the back $b$ of the case. The outer end of the implement is then depressed. Thereby the implement is brought into contact with the lower edge of the slot $r$, which forms a fulcrum, and by the further depression of the outer end of the opening implement the latch is forced open against the action of the spring $i$. The position of this spring is such as to render any tampering therewith difficult, and its temper and strength such as to make the operation of the latch impossible except by means of a comparatively clumsy implement. By the use of such an implement the card is pierced and torn in such a manner that its lacerated condition will be evident on the most cursory inspection.

Having now particularly described and ascertained the nature of our said invention and in what manner the same is to be performed, we declare that what we claim is—

A seal-lock for boxes or the like comprising a suitable casing, a latch within the casing, an opening in the latch into which an instrument may be inserted to operate the latch, an opening in the front of the casing through which the instrument to operate the latch may be inserted and an outer plate provided with a recess to receive a sealing-card which will cover the opening in the casing, whereby the card has to be perforated before the latch can be operated, and a second opening in the outer plate through which foreign matter may be readily removed.

In witness whereof we have hereunto set our hands, this 27th day of November, 1903, in the presence of two witnesses.

WILLIAM VICKERY.
GEORGE VICKERY.
TOM HARDING.

Witnesses:
JAMES SHARVERO,
FREDERICK C. PYM.